United States Patent
Sanchez-Vazquez et al.

(10) Patent No.: US 10,280,481 B2
(45) Date of Patent: May 7, 2019

(54) METHOD FOR BIOLEACHING AND SOLVENT EXTRACTION WITH SELECTIVE RECOVERY OF COPPER AND ZINC FROM POLYMETAL CONCENTRATES OF SULFIDES

(71) Applicant: SERVICIOS CONDUMEX S.A. DE C.V., Santiago de Querétaro, Querétaro (MX)

(72) Inventors: Belisario Sanchez-Vazquez, Querétaro (MX); Francisco Estrada-De Los Santos, Querétaro (MX); Alfonso Lopez-Juarez, Querétaro (MX); Eric David Buendia-Cachu, Querétaro (MX); Ulises Monter-Valenzuela, Querétaro (MX)

(73) Assignee: SERVICIOS CONDUMEX S.A. DE C.V., Santiago de Querétaro, Querétaro (MX)

( * ) Notice: Subject to any disclaimer, the term of this patent is extended or adjusted under 35 U.S.C. 154(b) by 734 days.

(21) Appl. No.: 14/787,805

(22) PCT Filed: Oct. 30, 2013

(86) PCT No.: PCT/IB2013/002418
§ 371 (c)(1),
(2) Date: Oct. 29, 2015

(87) PCT Pub. No.: WO2014/177903
PCT Pub. Date: Nov. 6, 2014

(65) Prior Publication Data
US 2016/0115564 A1    Apr. 28, 2016

(30) Foreign Application Priority Data
Apr. 29, 2013  (MX) .................. MX/a/2013/004855

(51) Int. Cl.
*C21B 15/00* (2006.01)
*C22B 3/18* (2006.01)
(Continued)

(52) U.S. Cl.
CPC ................ *C22B 3/18* (2013.01); *C21B 15/00* (2013.01); *C22B 3/0005* (2013.01); *C22B 3/08* (2013.01);
(Continued)

(58) Field of Classification Search
None
See application file for complete search history.

(56) References Cited

U.S. PATENT DOCUMENTS 6,406,676 B1 *  6/2002  Sundkvist ................ C22B 3/44
                                                            423/140
2005/0066773 A1   3/2005  Harlamovs et al.

FOREIGN PATENT DOCUMENTS

EP    1063308 A2   12/2000
WO    9428184 A1   12/1994
(Continued)

OTHER PUBLICATIONS

Zhu, Z and Cheng, C Y., "A study on zinc recovery from leach solutions using lonquest 801 and its mixture with D2EHPA" Minerals Engineering, pp. 117-213, vol. 39 (Jul. 2012).
(Continued)

*Primary Examiner* — Guinever S Gregorio
(74) *Attorney, Agent, or Firm* — Browdy and Neimark, PLLC

(57) ABSTRACT

A bioleaching and solvent extraction process with selective recovery of copper and zinc from polymetallic sulphide concentrates is described, comprising a bioleaching and ferric ion reducing process and a copper and zinc solvent extraction process.
(Continued)

The bioleaching and ferric ion reducing process comprises a concentrates pulp conditioning step; a bioleaching step, wherein once the pulp is conditioned it is subjected to a bioleaching process using a plurality of bioreactors of the stirred-tank type with an air injection and diffusion system, which allows handling of a pulp density higher than 15%; a step of solid separation from a solution rich in metallic ions from the bioleaching step; and, a ferric ion reduction step, wherein the pulp from the previous step is subjected to a transformation step of ferric ions into ferrous ions.

The solvent extraction step comprises a copper solvent extraction and electrolysis step; an arsenic control step, wherein arsenic is controlled in the solution once copper has been extracted from it; and, a zinc solvent extraction and electrolysis step, which uses a phosphinic acid-based zinc extraction dissolution.

25 Claims, 7 Drawing Sheets

(51) Int. Cl.
C22B 19/20 (2006.01)
C22B 3/26 (2006.01)
C22B 15/00 (2006.01)
C22B 3/08 (2006.01)
C22B 3/12 (2006.01)
C22B 3/22 (2006.01)
C22B 3/44 (2006.01)
C22B 3/00 (2006.01)
C25C 1/12 (2006.01)

(52) U.S. Cl.
CPC ............... *C22B 3/12* (2013.01); *C22B 3/22* (2013.01); *C22B 3/44* (2013.01); *C22B 15/0065* (2013.01); *C22B 15/0071* (2013.01); *C22B 19/20* (2013.01); *C22B 19/22* (2013.01); *C25C 1/12* (2013.01); *Y02P 10/138* (2015.11); *Y02P 10/234* (2015.11); *Y02P 10/236* (2015.11)

(56) References Cited

FOREIGN PATENT DOCUMENTS

WO 0023629 A1 4/2000
WO 2013057557 A1 4/2013

OTHER PUBLICATIONS

Ali A M I et al., "Cyanex 272 for the extraction and recovery of zinc from aqueous waste solution using a mixer-settler unit", Separation and purification technology, abstract (Jan. 2006).

Lan Zhuo-yue et al., "Solvent extraction of cooper and zinc from bioleaching solutions with LIX 984 and D2EHPA" Journal of Central South University of Technology, pp. 45-49, vol. 12 No. 1 (Feb. 2005).

Bolin N J et al., "Two stage precipitation process of iron and arsenic from acid leaching solutions", Transactions of nonferrous metals Society of China, pp. 1513-1517, vol. 18 (Jan. 2008).

\* cited by examiner

METHOD FOR BIOLEACHING AND SOLVENT EXTRACTION WITH SELECTIVE RECOVERY OF COPPER AND ZINC FROM POLYMETAL CONCENTRATES OF SULFIDES

FIELD OF THE INVENTION

The present invention is related to the processing of minerals and sulphide-based concentrates, as well as to the extraction of metals by using moderate or extreme thermophilic microorganisms in the Extractive Industries, and more particularly, it relates to a bioleaching and solvent extraction process with selective recovery of copper and zinc from sulphide polymetallic concentrates.

BACKGROUND OF THE INVENTION

The current production of high-degree and commercially-valuable copper and zinc concentrates is having technical difficulties, since during the ore deposit exploitation, low-grade areas of metals having a commercial value have been found, and which due to the mineral complexity in the deposit, makes non-profitable the flotation-based obtainment of the concentrate in beneficiation plants. The presence of arsenic and antimony impurities makes the commercial concentrate (copper, zinc) to have an economic penalization, thereby reducing its commercial value.

The obtainment of copper has traditionally been carried out from the casting of ore concentrates in furnaces, in order to produce a "Blister" copper having 98.5% purity, which is subsequently poured to anodes and, finally, it is electro-refined in order to obtain a high purity cathodic copper (99.999%).

Also, the extraction of copper is made by hydrometallurgical processes, such as the leaching in lumps or beds of low-grade ore having secondary oxides or sulfides non-susceptible to flotation, and the purification by solvent extraction, which is currently preferred due to its low-cost and less adverse environmental effects.

The current obtainment process for zinc has traditionally been carried out by a roasting system of zinc concentrates in a fluidized-bed furnace in order to oxidize the ore, thus generating a calcine, which is subsequently treated by a hydrometallurgical process, wherein the zinc is recovered in a solution being refined and purified, in a final step, the metal in solution is electro-deposited in aluminium cathodes, the zinc is obtained as metal sheets, and casted for its shaping in zinc bars with a high degree of purity (SGH). This process has drawbacks to process concentrates having impurities such as iron, arsenic, antimony, among others.

The use of thio-oxidizing and/or iron-oxidizing microorganisms in the ore and copper or zinc sulphide-based concentrates dissolution process, is known as bioleaching and has been used as an alternative to the extraction of base metals. Ores and/or sulphide-based concentrates of copper, zinc, nickel, cobalt, have been treated in processes such as heapleaching or continuous leaching in stirred tanks.

One of the processes for the treatment of copper and zinc sulphide-based concentrates uses continuous-flow stirred-tank type reactors having aeration systems, which are placed in series, wherein the concentrate or ore (metal sulphide) finely milled is added to the first reactor together with inorganic nutrients. The ore pulp flows through the reactors at controlled pH and temperature, and it contains microorganisms that carry out the dissolution of the mineral species present in the concentrate; in this case, it is performed by using iron-oxidizing and thio-oxidizing acidophilic microorganisms, which live at temperatures in the range of 25° C. to 90° C., and which are able to tolerate high acidic levels and dissolved metallic ions.

One of the biggest challenges during the operation of the stirred tanks is the coexistence between the amount of solids (pulp density) maintained in suspension and the presence of microorganisms. The processes currently developed are limited to no more than 15% in pulp density since issues occur as a result of physical damage to the microorganisms, thereby inhibiting the dissolution.

Since the microorganisms used are temperature dependent for their growth, processes by operating type and temperature have been developed. Microorganisms that have been widely used in bioleaching processes are mesophilic bacteria as *Acidithiobacillus ferrooxidans, Acidithiobacillus thiooxidans* and *Leptosprilium ferrooxidans* at temperatures near to 40° C. Thermophilic bacteria of the type *Sulfolobus*, and archaea as *Sulfolobus* spp have been used due to their potential to increase the extraction kinetics of metals from sulphide ores at temperatures above 50° C. The minerals depleted from this bioleaching step are removed and sent to confinement. During the bioleaching step, copper and zinc are obtained in a ionic form in a sulphate media.

Once obtained the solution rich in copper and/or zinc, it is necessary to perform the separation, concentration, purification and recovery of these metals in solution, thereby involving the use of water-immiscible organic extractants, dissolved in organic solvents (organic phase). The aqueous solution with the obtained metals is contacted with specific extractants such as Aldoximes, Ketoximes and phosphinic acids, and through the chemical reaction of interchange or transfer between the proton and the metal cation, it allows separating the cation of economic interest, which is transferred to the organic phase. In order to concentrate the metal ion of interest and to regenerate the organic phase for its reuse, an acid environment is used, producing a concentrated metal solution that is sent to electrolysis in order to obtain the refined metal.

Among the patents having been developed for the treatment of copper or zinc metal sulphide-based concentrates there is, for example, Patent Application WO00/23629 A1, wherein a method for biolixiviating copper concentrates is shown, wherein a copper ore is subjected to a process involving iron/sulfur oxidizing microorganisms in order to obtain a copper-containing solution, said solution is contacted with a mixture of a commercial extractant and organic solvent to partially extract the copper from the solution. When contacting the organic phase in the solvent extraction step the copper is concentrated. Once a concentrated and purified solution has been obtained, it is processed in an electrolysis step.

According to Patent Application WO01/18266 A1, a method for zinc recovery is shown, by means of an integrated bioleaching and solvent extraction system, which is proposed as an alternative for the treatment of zinc. Mainly, metallic zinc and byproducts such as copper and plaster are obtained, which can be marketed and/or confined according to the current environmental legislation.

In Patent WO9428184 A1, zinc recovery is proposed by means of a combined process of zinc concentrates bioleaching and solvent extraction, wherein Diethyl-hexyl phosphoric acid (D2EHPA) is used as organic extractant, and lonquest 801 as a diluent to specifically recover zinc from sulphate solutions.

As may be seen, in the current state of the art, the use of combined processes of bioleaching and solvent extraction for the selective recovery of copper or zinc is described; however, the processes described in the prior art, have the disadvantage of being unable to be used with pulp densities higher than 15%, having high contents of arsenic and iron, and further they consume an excessive amount of oxygen during the bioleaching process.

Therefore, it has been sought to overcome the drawbacks of the prior art by means of the development of a bioleaching and solvent extraction process with selective recovery of copper and zinc from sulphide polymetallic concentrates, which allows the handling of pulp densities higher than 15%, with high contents of iron and arsenic, and having a more efficient operation through less oxygen consumption during the bioleaching.

OBJECTS OF THE INVENTION

Considering the limitations of the prior art, is an object of the present invention to provide a bioleaching and solvent extraction process with selective recovery of copper and zinc from sulphide polymetallic concentrates, which allows the handling of pulp densities higher than 15% with high contents of iron and arsenic.

Another object of the present invention is to provide a bioleaching and solvent extraction process with selective recovery of copper and zinc from sulphide polymetallic concentrates, which allows a more efficient operation through less oxygen consumption during the bioleaching process.

An additional object of the present invention is to provide a bioleaching and solvent extraction process with selective recovery of copper and zinc from sulphide polymetallic concentrates, which allows the use of bioleaching bioreactors of the stirred-tank type, having an air injection and diffusion system allowing to control the fine air bubble size, thereby improving the distribution of oxygen and carbon dioxide, which are required by the microorganisms promoting the bioleaching process, in order to maintain the cell concentration during the process.

It is a further object of the present invention to provide a bioleaching and solvent extraction process with selective recovery of copper and zinc from sulphide polymetallic concentrates, which allows the use of bioleaching bioreactors of the stirred-tank type, having an air injection and diffusion system, which allows a continuous process and thereby to reach a high recovery of metals in solution.

It is another object of the present invention to provide a bioleaching and solvent extraction process with selective recovery of copper and zinc from sulphide polymetallic concentrates, which allows to use an organic extractant, in order to use a single acid matrix during the selective stripping of zinc.

BRIEF DESCRIPTION OF THE INVENTION

The present invention relates to a method of obtaining metallic zinc (Zn) and copper (Cu) from ores and/or sulphide-based complex concentrates (mixed, polymetallic) having iron (Fe) and arsenic (As), by using an integrated process comprising bioleaching (as ore dissolution step); and, solvent extraction with selective recovery (purification and electro-deposition of copper-zinc); further including a step of arsenic control.

The invention relates to:
  The recovery of metallic copper and zinc from polymetallic ore sulphide concentrates by a continuous and integral process comprising bioleaching and solvent extraction.

The use of a bioleaching process through high-efficiency air-distribution bioreactors, operating at a temperature ranging from 25° C. to 90° C. The reactors array may be in series, parallel or parallel-series combinations, which makes possible to have a versatile design with the purpose of maintaining a continuous operation. The process allows to process pulp densities higher than 15% solids.

A two-step solvent extraction process for the selective recovery of copper and zinc from a high zinc concentration and medium copper concentration solution, and further electrodeposition in metallic form.

A dissolved arsenic control step, by forming stable compounds for final disposal.

The bioleaching and solvent extraction process with selective recovery of the present invention comprises in general two main processes: a bioleaching and ferric ion reduction process, and, a copper and zinc solvent extraction process.

The bioleaching and ferric ion reduction process includes the following steps:
  a).—Conditioning of the feeding pulp;
  b).—Bioleaching of the feeding pulp, using a set of bioreactors of the mechanical stirred-tank type including an air injection and diffusion system;
  c).—Solid separation of the pulp from the bioleaching step; and,
  d).—Ferric ion transformation (reduction).

The copper and zinc solvent extraction process comprises the following steps:
  a).—Copper solvent extraction and electrolysis;
  b).—Arsenic control; and,
  c).—Zinc solvent extraction and electrolysis.

BRIEF DESCRIPTION OF THE DRAWINGS

Novel aspects considered characteristic of the present invention will be established particularity in the appended claims. However, some embodiments, characteristics and some objects and advantages thereof will be better understood from the detailed description, when read related to the appended drawings, wherein:

DETAILED DESCRIPTION

Figure 1:
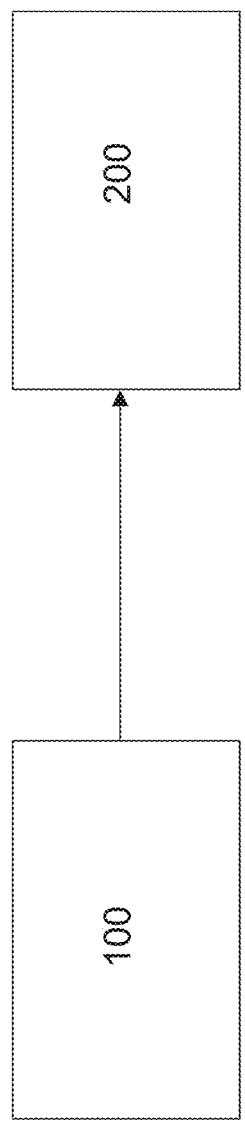
FIG. 1 is a block diagram of the bioleaching and solvent extraction process with selective recovery of copper and zinc from sulphide polymetallic concentrates, according to the principles of a preferred embodiment of the present invention.

Now making reference to the appended drawings, and more specifically to FIG. 1 thereof, a bioleaching and solvent extraction process with selective recovery of copper and zinc from sulphide polymetallic concentrates is shown, which is carried out according to a particularly preferred embodiment of the invention, which should be considered as illustrative and non-limitative thereof, wherein a pulp of concentrates of polymetallic sulphide minerals is subjected to a process comprising a bioleaching and ferric ion reduction process 100, followed by a copper (Cu) and zinc (Zn) solvent extraction process 200.

Figure 2:
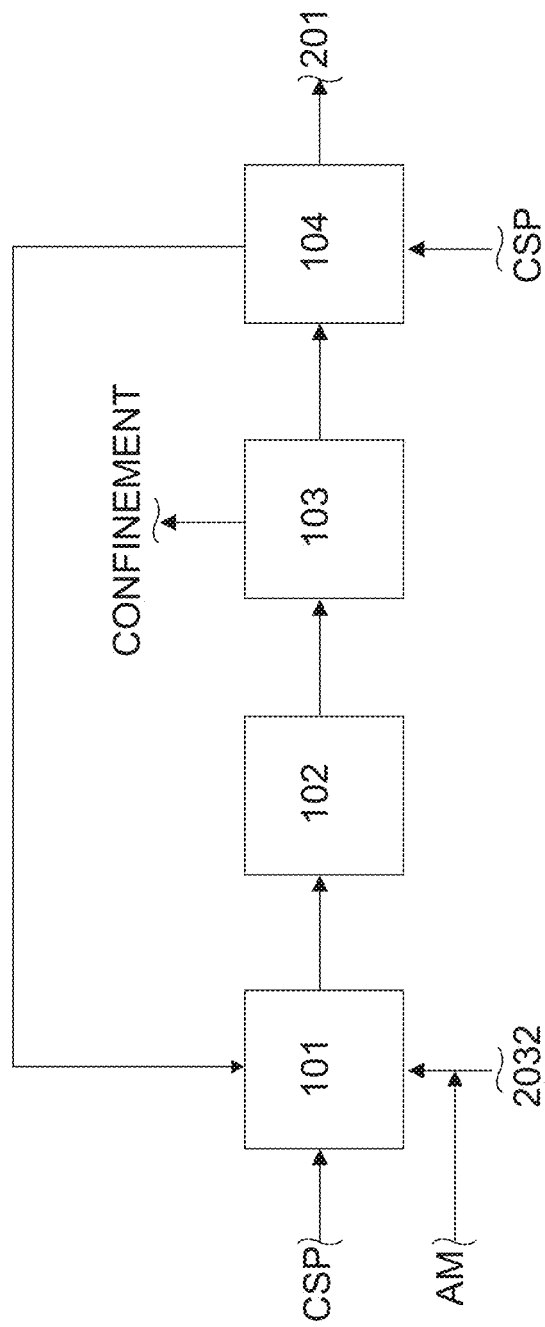
FIG. 2 is a block diagram of the bioleaching and ferric ion reduction process, which is carried out as a first step of the process shown in FIG. 1.

The bioleaching and ferric ion reduction process, as shown in FIG. 2, comprises a step of conditioning a pulp of concentrates 101, which once conditioned is sent to a bioleaching process; a bioleaching step 102, wherein the conditioned pulp from step 101 is subjected to a bioleaching process using a plurality of bioreactors of the stirred-tank type having an air injection and diffusion system; a solid separation step 103 from a solution rich in metal ions from the bioleaching step 102; and, a ferric ion reduction step 104, wherein the pulp from the solid separation step is subjected to a transformation step of the ferric ions to ferrous ions.

Figure 3:
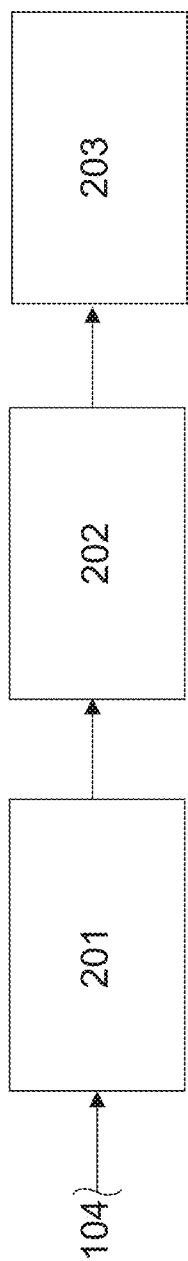
FIG. 3 is a block diagram of the copper and zinc solvent extraction process, which is carried out as a second step of the process shown in FIG. 1.
Figure 4:
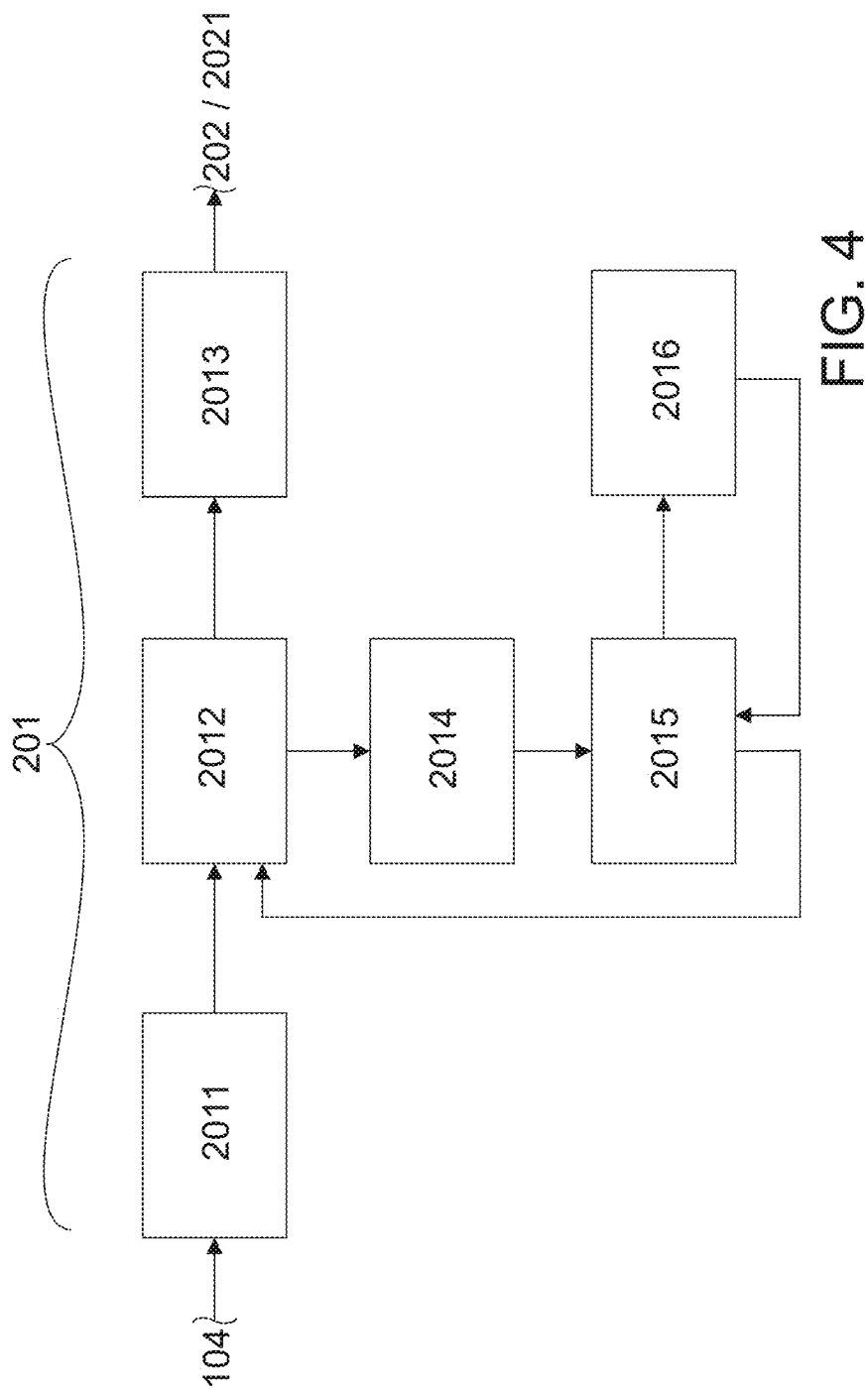
FIG. 4 is a block diagram of the copper solvent extraction and electrolysis process, which is carried out as a first step of the process shown in FIG. 3.
Figure 5:
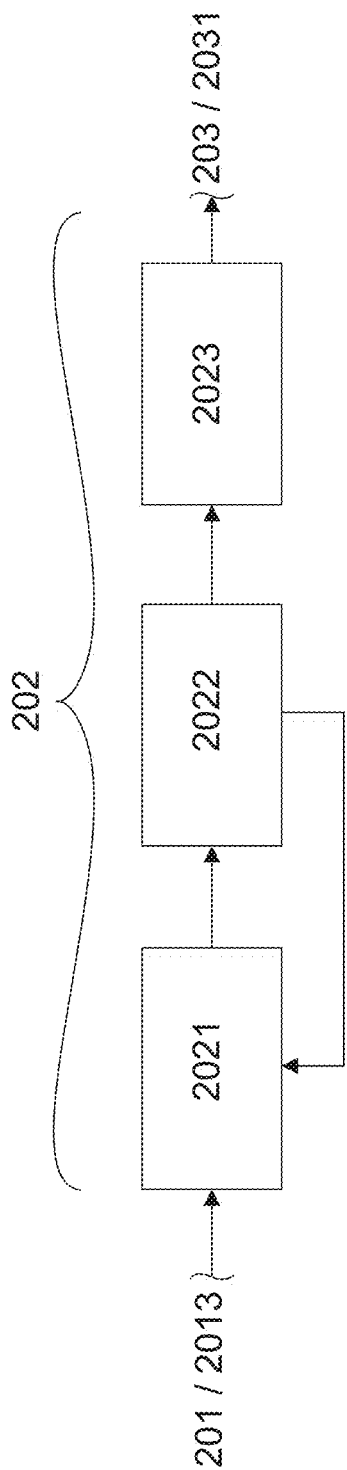
FIG. 5 is a block diagram of the zinc solvent extraction and electrolysis process, which is carried out as an intermediate step of the process shown in FIG. 3.
Figure 6:
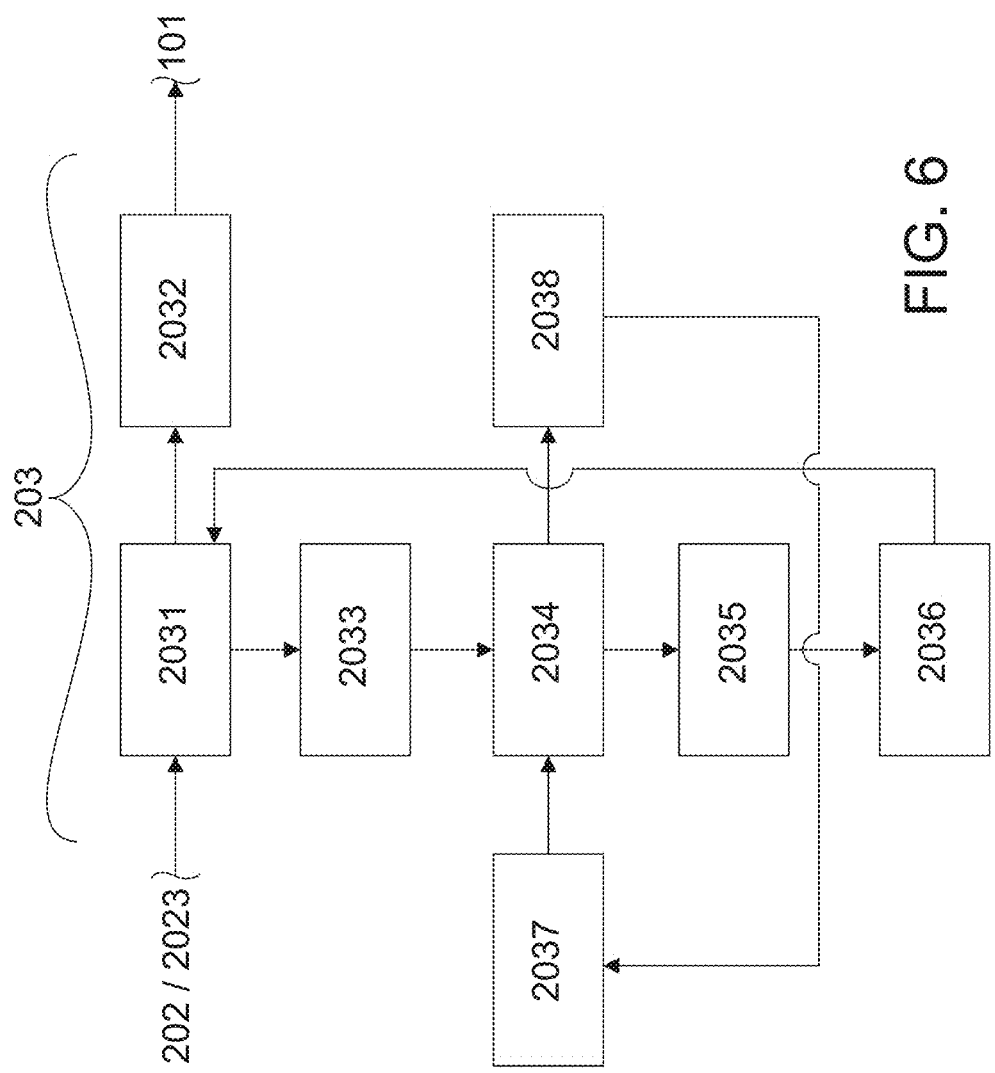
FIG. 6 is a block diagram of the zinc solvent extraction and electrolysis process, which is carried out as a final step of the process shown in FIG. 3.

The solvent extraction step 200, as shown in FIG. 3, comprises a copper solvent extraction and electrolysis step 201, to which the solution from step 104 of ferric ion reduction is fed as raw material, in order to extract copper; an arsenic control step 202, wherein the arsenic is controlled in the solution to which the copper has been extracted from, and coming from step 201 of copper solvent extraction and electrolysis; and, a zinc solvent extraction and electrolysis step 203, wherein the zinc is extracted from the solution having controlled arsenic, and coming from step 202.

The concentrates pulp conditioning step 101, consists in sending to a mixing re-pulping tank the following: a stream of a polymetallic concentrate (partially attacked) coming from the ferric ion reduction step 104, a mine water stream (MW), a stream of fresh polymetallic sulphide solids (PSS) coming from the solid storage, and a stream of a zinc depleted aqueous solution coming from step 2032 of washing/conditioning of said zinc depleted aqueous solution, which step will be described below. Once these streams are in the re-pulping tank and while being mixed, sulphuric acid is added in order to adjust the pH to a range of 1.4 to 1.8 prior to sending them to the bioleaching step 102.

Once the pulp is conditioned, this is sent to the bioleaching step 102, wherein the pulp is fed to a plurality of bioreactors of the stirred-tank type having an air injection and diffusion system such as that described in Mexican Patent Application No. MX/a/2011/011147 of the same applicant than the present invention, which allows the bioleaching process to operatively reach a solid pulp density higher than 15%, as well as a high air distribution efficiency, and further, the evaporated water during the process is recovered by means of the bioreactor condensers system.

The output from the bioleaching step 102 is a pulp comprised by a solution rich in metal ions (particularly ferric ion, Cu, and Zn) and depleted minerals which is ready to be subjected to the solid separation step 103.

In a preferred embodiment of the present invention, a plurality of bioreactors is used to carry out the bioleaching, preferably consisting of five equally-dimensioned cyilindrically-shaped stirred bioreactors, with 1.5:1 height/diameter ratio, in a 2-1-1-1 array (two bioreactors in parallel and three bioreactors in series), wherein the flow of the solution between each reactor is by gravity. Each bioreactor is provided with a cooling/heating system, mechanical stirring, operation parameters control, air supply, operating at atmospheric pressure, as well as feeding ports allowing the addition of nutrients, water, gas and acid.

The process in the bioleaching bioreactor is carried out through a set of simultaneous mechanisms according to the following:

Bioleaching: A mineral dissolution by action of microorganisms is made, in this particular case by thermophilic microorganisms, which live at temperatures from 50° C. to 90° C., and which are able to stand high acidity levels, the process is developed in a residence time of 10 days.

Ferric Leaching: It is performed by the oxidation of sulphide-based minerals in the presence of ferric ion.

Galvanic interactions: They are performed by the difference in the oxidation potentials among the sulphide-based mineral species present in the concentrate, which form galvanic pairs favoring the dissolution of the more reactive mineral species.

With respect to the solid separation step 103, this consists in subjecting the pulp coming from the bioleaching step 102, comprised by a solution rich in metal ions (particularly ferric ion, Cu, and Zn) and depleted minerals, to a filtering operation preferably in a plate filter, whereby two products are obtained: a mixture of depleted minerals sent to confinement; and, an intermediate and clarified solution rich in ferric ion, which is sent to the ferric ion reduction step 104.

To carry out the ferric ion reduction step 104, it is necessary to have a first stream with the ferric ion high-contents intermediate solution, and also having high acidity (pH<1.5), which is sent to a conventional reactor at atmospheric pressure, wherein a second stream is added including a polymetallic sulphide concentrate (PSC) with a particle size lower than 20 μm coming from the solid storage in order to achieve the desired conditions.

Both streams enter the reactor wherein the continuous flow chemical reaction of mineral dissolution is performed, in order to achieve the transformation of the ferric ions to ferrous ions. The volume of the solids is reduced by the mineral concentrate leaching, and as a result of the chemical reaction, there is a proton consumption by the acid attack to the sulphides present (increase in pH), with a further increase in Zn and Cu contents in the solution.

The ferric ion reduction step 104, has a temperature control (between 60° C. and 80° C.) and an acidity (pH) monitoring, in addition to the monitoring of the transformation of the ferric ions to ferrous ions by analytical methods. Upon completion of the reaction, the reactor output is sent to a filtration step preferably in a plate filter, in order to separate the non-reacted solids from the resulting solution. The non-reacted solids are sent to the re-pulping tank of step 101 prior to the bioleaching step.

The solution obtained from the filter is rich in copper and zinc, and also has low ferric ion contents, so once obtained is sent to the copper solvent extraction and electrolysis step 201 of the copper and zinc solvent extraction process 200.

The copper solvent extraction and electrolysis step 201 consists of feeding the clarified solution, rich in copper and zinc coming from the ferric ion reduction step 104, to a storage step 2011, in a storage tank for a solution rich in copper and zinc, to be later pumped to a copper extraction step 2012 in a copper extraction mixer/settler tank, which consists of two stages in series and in countercurrent, operating at atmospheric pressure and temperature.

The solution entering the copper extraction tank is countercurrently contacted with an organic compound in order to extract the copper. As extractant organic compounds, phenolic oximes (aldoximes), which are commercially available, mixed in an organic diluent (kerosene) are preferably used. The organic solution stream charged with copper leaving the extraction equipment in step 2012, is sent to an organic wash step 2014 in an organic compound washing equipment; and, the aqueous solution stream rich in zinc and arsenic that also leaves the extraction equipment, is sent to an aqueous washing step 2013 in a mixing/settling equipment in order to remove the organic debris, prior to be sent to the arsenic control step 202 (As).

Once the organic solution stream charged with copper goes through the organic washing step 2014 in the organic washing equipment, the outlet stream is an organic stream charged with copper, which is sent to a copper removing step 2015 in a mixing/settling equipment. At this copper removing step, the organic stream charged with copper is countercurrently contacted with a copper depleted electrolyte solution having an acidity >150 g/l $H_2SO_4$, wherein the depleted electrolyte is enriched with the copper from the organic stream. The electrolyte already enriched with copper, is sent to a copper electrodeposition step 2016.

After the copper separation in the removing step 2015, the organic stream without copper is recycled back to the solvent extraction step 2012 to start again the loading cycle with copper.

On the other hand, the copper depleted electrolyte being fed in the copper removing step 2015, is a highly acidified electrolyte coming from the electrodeposition area 2016, which is sent to said copper removing step 2015, to start again the loading cycle with copper.

As already mentioned above, the aqueous solution stream rich in zinc and arsenic leaving the copper extraction step 2012, once the aqueous has been washed in step 2013 to remove the organic debris coming from the copper solvent extraction process, is sent to the arsenic control step 202, which comprises feeding the aqueous solution rich in zinc and arsenic to an arsenic conditioning and precipitation step 2021, which is performed in a pH conditioning and precipitation tank, wherein the arsenic control is made by its precipitation and co-precipitation, by contacting the aqueous solution rich in zinc and arsenic with a pH modifying agent to generate arsenic-rich ferrous compounds ($FeAsO_4 \cdot 2H_2O$).

The pH modifying agent used may be selected from ammonium hydroxide, sodium hydroxide, calcium hydroxide, magnesium hydroxide, preferably using ammonium hydroxide.

The pulp obtained in the conditioning and precipitation tank is sent to a filtration step 2022 in a press filter for the arsenic separation. Part of the recovered solids are returned back to the arsenic conditioning and precipitation tank, for it to act as initiator in the precipitation thereof. The rest of the paste having high arsenic contents is sent to a final disposal.

With respect to the arsenic-free solution rich in zinc recovered in the press filter, it is sent to a storage step 2023 in a high zinc contents liquor storage tank.

Once clarified the solution from the arsenic control step 202 in the storage tank for the solution rich in zinc, it is pumped to a zinc solvent extraction and electrolysis step 203.

The zinc solvent extraction and electrolysis step 203 comprises sending the solution rich in zinc to a zinc extraction step 2031, wherein preferably a plurality of mixing/settling tanks is used for the zinc extraction, wherein the solution rich in zinc is countercurrently contacted with a zinc extractant dissolution.

In a preferred embodiment, the plurality of mixing/settling tanks for zinc extraction consists of an array of tanks in series of up to five stages, which as already mentioned, countercurrently contact the solution rich in zinc with a zinc extractant dissolution.

For the solvent extraction, phosphinic acid compounds are used as extractant dissolution, preferably 2,4,4-trimethylpentyl phosphinic acid dissolved in kerosene having a concentration from 10% to 50% volume.

The use of phosphinic acid dissolved in kerosene for the zinc recovery is what allows the use of a single acid ($H_2SO_4$) to perform a selective remotion of the metal of interest (zinc) and the subsequent co-extraction of impurities (iron), thereby using one single adjustment in said acid concentration.

In other processes using D2HEPA, sulphuric acid needs to be used for the zinc remotion, and then in order to remove the co-extracted iron, 5M hydrochloric acid (HCl) has to be used, with all the inconveniences involved in working with said acid, whereas as already mentioned above, with the use of phosphinic acid dissolved in kerosene, only $H_2SO_4$ is used, which implies a great advantage from the operation and economic points of view.

Once the zinc depleted aqueous solution has left the mixing/settling tank array of step 2031 is rich in ferrous ions, whereby this zinc depleted aqueous solution is sent to a washing/conditioning step 2032, prior to be sent back to the re-pulping tank of the pulp conditioning step 101, and prior to be subjected again to the bioleaching step 102.

The zinc loaded organic stream from the mixing/settling tank array of step 2031, is sent to an organic washing step 2033, wherein the aqueous solution debris are removed using an acidified aqueous solution ($H_2SO_4$) having a pH between 2 and 3, using up to two mixing/settling tanks similar to those of the previous step, prior to be subjected to a zinc selective removing step 2034, followed by an iron selective removing step 2035.

In the zinc removing step 2034, a zinc depleted electrolyte solution is enriched, coming from a zinc electrodeposition step 2037 by countercurrently contacting it with the zinc loaded organic stream from the organic washing step 2033, using up to two mixing/settling tanks similar to those of the previous step. The zinc enriched electrolyte solution obtained and leaving this step 2034, is sent to a zinc purification step 2038 in a plurality of cementing/filtering tanks, and it is subsequently sent to the zinc electrodeposition step 2037 in an electrodeposition cell.

The organic solution without zinc and now rich in iron from step 2034, is sent to an iron removing step 2035, in a mixing/settling tank similar to the previous ones, wherein the iron Fe (III) co-extracted in the organic when countercurrently contacted with a sulphuric acid solution having an acidity of >200 g/L, is extracted.

After the separation in the iron Fe (III) removal step 2035, the discharged organic flows to a neutralization step 2036 in a neutralization step, prior to be countercurrently sent to the zinc solvent extraction step 2031 to start again the loading cycle with zinc.

Importantly, the operating conditions of the solvent extraction process are room temperature and atmospheric pressure.

EXAMPLES

Several experimental tests and runs were carried out in the laboratory as well as in a pilot plant, using various conditions and material loadings, which are respectively indicated in each of the performed tests, and listed below, where it was proven that the process of the present invention has the following advantages with respect to the prior art processes:

Test 1.—Suspension solid concentration handle (pulp of polymetallic sulphide concentrates rich in Cu, and Zn) of at least 15% in the process, preferably higher than 20%.

Table I shows the evolution in the zinc dissolution during the processing of a zinc concentrate enriched with Pyrite at 20% solids:

TABLE I

| Step BIOLEACHING | Zn Extraction, % |
|---|---|
| First | 61.35 |
| Second | 71.56 |
| Third | 88.56 |
| Fourth | >99 |

In Table II the concentration of Zn and Cu is shown as the steps in the cascade array of five bioleaching bioreactors evolve, using a 2-1-1-1 array, operating with 27.5% solids and 12 days of residence.

TABLE II

Stepwise Zn and Cu extraction in the processing of a Cu—Zn concentrate.

| Step BIOLEACHING | Zn Extraction, % | Cu Extraction, % |
|---|---|---|
| First | 33.50 | 22.67 |
| Second | 43.40 | 31.61 |
| Third | 71.81 | 66.32 |
| Fourth | 97.79 | 99.74 |

Test 2.—Ability to bioleach sulphide-form concentrates with high arsenic contents.

Figure 7:
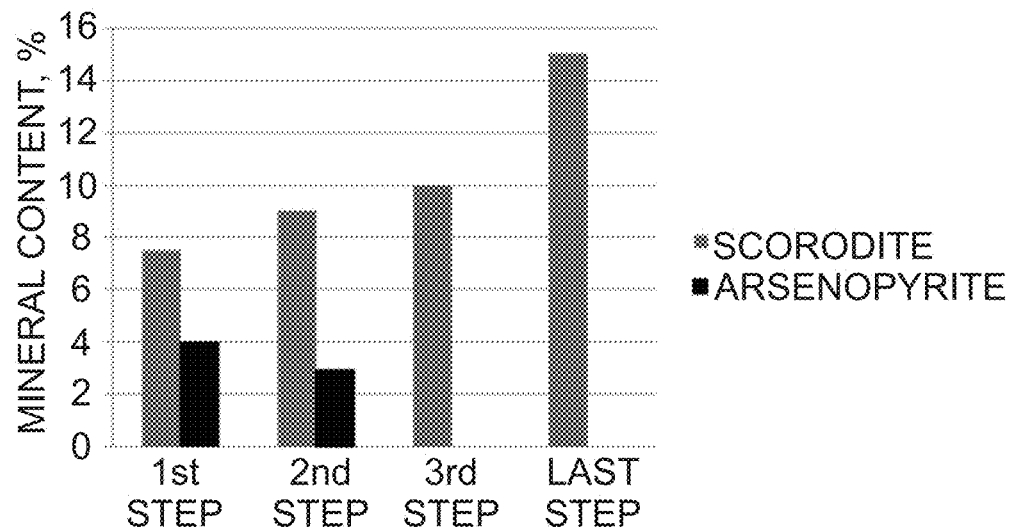
FIG. 7 is a plot showing the evolution of the scorodite formation from arsenopyrite oxidation in the polymetallic concentrate.

FIG. 7 shows the evolution in the generation of Scorodite ($FeAsO_4 \cdot 2H_2O$), during the bioleaching process, which allows production of an arsenic stable compound for its final disposal.

Test 3.—Integrated water recovery system during the process.

Since this is a cyclic process, it allows to recover the great majority of the process water in the following steps: bioleaching, solvent extraction and electroreduction.

In addition, by using the bioreactors of Mexican Patent Application MX/a/2011/011147 of the same applicant of the present invention, which include a high-efficiency condensers system, a high recovery rate of the water evaporated during the bioleaching process is allowed.

With the condensers system of each of the bioleaching bioreactors, an increase in water recovery higher than 85% was reached.

Test 4.—During the bioleaching step, by using the bioreactors of Mexican Patent Application MX/a/2011/011147 of the same applicant of the present invention, oxygen distribution is improved by means of the air injection system incorporated in each one of the used bioreactors, which allows the enhancement of metal extraction kinetics in the bioleaching; and, therefore, reduction of the processing time.

TABLE III

Solids concentration average in water (% wt) at 4 different depths in the bioreactor.

| | Condition | |
|---|---|---|
| % wt | Impeller number | Water/air mix injection |
| Assay 1 | 1/20% | Yes/20% |
| Assay 2 | 1/20% | No/20% |
| Assay 3 | 2/20% | Yes/20% |
| Assay 4 | 2/20% | No/20% |

Test 5.—In other processes of the prior art, since none of the bioreactors of Mexican Patent Application MX/a/2011/011147 of the same applicant of the present invention is used, it is necessary to add an excess of oxygen in the air stream, which increases operative costs. In the following table the results using said bioreactor are shown:

TABLE IV

Test results by modifying the air/water mixture flow without oxygen enrichment, and monitoring of the dissolved oxygen at a temperature of 70° C. and a fixed stirring speed of 300 rpm with a single impeller.

| Condition | Mix Flow in LPM | Dissolved oxygen ppm |
|---|---|---|
| Assay 1 | 200 | 3.50 |
| Assay 2 | 150 | 3.45 |
| Assay 3 | 100 | 3.15 |
| Assay 4 | 50 | 2.50 |

Test 6.—Ferric ion transformation step and intermediate solution proton consumption. Pulps were processed with solids higher than 15%, also allowing for a Zn selective extraction in the solvent extraction step.

The results in the ferric ion transformation step and proton consumption measured through the oxide-reduction potential (ORP) and pH, as well as the increase in Zn concentration, for a Zn concentrate enriched with Pyrite for different tests performed, are shown in Table V:

TABLE V

Ferric ion reduction step
ORP decrease, pH and Zn increase in the solution.

| ORP, mV (vs Ag/AgCl) | | pH | | Zn |
|---|---|---|---|---|
| Before | After | Before | After | increase, % |
| 481 | 368 | 1.42 | 1.57 | 15.83 |
| 526 | 327 | 1.18 | 1.37 | 12.21 |
| 509 | 368 | 1.20 | 1.34 | 8.37 |

The results of ferric ions consumption indirectly measured by ORP in the ferric ion transformation step, as well as proton consumption (pH increase) in the Cu and Zn intermediate solution for the polymetallic concentrate, are shown in Table VI:

TABLE VI

Ferric ion reduction step
ORP decrease and acidity increase in the solution.

| ORP, mV (vs Ag/AgCl) | | pH | | Free acid, g/L | |
|---|---|---|---|---|---|
| Before | After | Before | After | Before | After |
| 502 | 334 | 1.53 | 1.85 | 5.78 | 2.77 |
| 509 | 332 | 1.50 | 1.81 | 6.20 | 3.04 |
| 508 | 337 | 1.44 | 1.75 | 7.12 | 3.49 |

The results of the Cu and Zn concentration increase in the output solution from the ferric ion reduction step, are shown in Table VII:

TABLE VII

Ferric ion reduction step
Cu and Zn concentration increase (complementary data of Table VI).

| Cu concentration increase, % | Zn concentration increase, % |
|---|---|
| 32 | 17 |
| 29 | 16 |
| 32 | 21 |

Test 8.—Proton consumption of the intermediate solution during Cu extraction step (maximum Cu load).

Table VIII shows the maximum load increase for the extractant as a function of the pH increase, proton concentration decrease.

TABLE VIII

Maximum load increase of the extractant as a function of pH.

| [$H^+$] | pH | g Cu/v/o |
|---|---|---|
| 0.1349 | 0.87 | 0.3804 |
| 0.1023 | 0.99 | 0.4134 |
| 0.0794 | 1.1 | 0.4083 |
| 0.0617 | 1.21 | 0.4447 |
| 0.0257 | 1.59 | 0.5660 |

Figure 8:
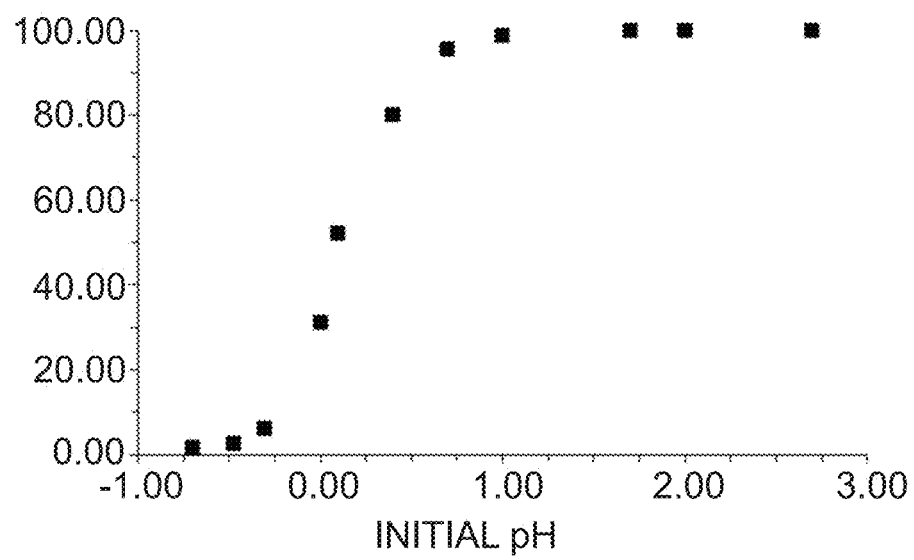
FIG. 8 is a plot showing the copper recovery in the extraction step as a function of pH.

FIG. 8 shows the efficiency increase in Cu extraction as a function of pH.

Test 9.—Table IX shows the selective removal, first of Zn and then of Fe(III), during the zinc recovery step with different acid concentrations (pH) in the aqueous solution.

TABLE IX

Results of the extraction and selective removal of Zn(II) and Fe(III) in the Zn recovery step using 2,4,4 trimethylpentyl phosphinic acid.

| Sample | pH | Fe, g/L | Zn, g/L |
|---|---|---|---|
| Head, First Step | 5.5 | 15.72 | 33.43 |
| Bottom, last step | 3.0 | 14.81 | 15.01 |
| Zn selective removal | 1.0 | 0.003 | 14.96 |
| Fe(III) selective removal | <0.1 | 0.251 | 2.50 |

According to the above description, it may be seen that the bioleaching and solvent extraction process with selective recovery of copper and zinc from sulphide polymetallic concentrates of the present invention has been devised to solve the problems of the prior art, by using a high suspended solid concentration (pulp of sulphide polymetallic concentrates), with respect to the prior art, as well as the use of a single adjustment in the sulphuric acid concentration for the recovery of zinc in the whole process; therefore, it will be apparent to those skilled in the art that the embodiments of the bioleaching and solvent extraction process with selective recovery of copper and zinc from sulphide polymetallic concentrates, as described above and shown in the appended drawings, are illustrative only and non-limitative of the present invention, since many consideration changes in its details are possible without departing from the scope of the invention.

Therefore, the present invention should not be considered restricted except by the prior art demands and by the scope of the appended claims.

What is claimed is:

1. A bioleaching and solvent extraction process with selective recovery of copper and zinc from sulphide polymetallic concentrates, comprising a bioleaching and ferric ion reduction step, followed by a copper and zinc solvent extraction step, wherein the bioleaching and ferric ion reduction step includes the steps of: a) conditioning of a sulphide polymetallic concentrates pulp; b) bioleaching of the sulphide polymetallic concentrates pulp; c) solid separation of the pulp coming from the bioleaching step; and d) ferric ion transformation (reduction); while the copper and zinc solvent extraction step includes the steps of: a) copper solvent extraction and electrolysis; b) arsenic control; and, c) zinc solvent extraction and electrolysis, wherein the bioleaching step is carried out by using a plurality of bioreactors of the stirred-tank type having an air injection and diffusion system, the bioreactors having 1.5:1 height/diameter ratio, thus allowing the bioleaching process to operatively reach a solid pulp density higher than 15%, as well as a high air distribution efficiency, and further, to recover the evaporated water during the process.

2. A bioleaching and solvent extraction process with selective recovery of copper and zinc from sulphide polymetallic concentrates, according to claim 1, wherein the pulp conditioning step consists of mixing a sulphide polymetallic concentrate stream (partially attacked), a mine water stream, a fresh solid stream of polymetallic sulphides, and a zinc depleted aqueous solution stream.

3. A bioleaching and solvent extraction process with selective recovery of copper and zinc from sulphide polymetallic concentrates, according to claim 2, wherein during the mixing sulphuric acid is added to adjust pH in a range from 1.4 to 1.8.

4. A bioleaching and solvent extraction process with selective recovery of copper and zinc from sulphide polymetallic concentrates, according to claim 1, wherein the bioleaching step is carried out using a plurality of bioreactors of the stirred-tank type having an air injection and diffusion system, which allows for the manipulation of a pulp solid density higher than 15%, a high air distribution efficiency, and also the recovery of water which evaporates during the process.

5. A bioleaching and solvent extraction process with selective recovery of copper and zinc from sulphide polymetallic concentrates, according to claim 4, wherein the obtained pulp comprises a rich metal ions solution, particularly ferric ion, copper and zinc.

6. A bioleaching and solvent extraction process with selective recovery of copper and zinc from sulphide polymetallic concentrates, according to claim 1, wherein the solid separation step comprises subjecting the pulp coming from the bioleaching step to a decantation or filtration operation, in order to obtain two products: a mixture of depleted minerals which are sent to confinement; and an intermediate and clarified solution rich in ferric ions, which is sent to the ferric ion reduction step.

7. A bioleaching and solvent extraction process with selective recovery of copper and zinc from sulphide polymetallic concentrates, according to claim 1, wherein the ferric ion reduction step comprises sending a first intermediate solution stream having high ion ferric contents and with a pH<1.5, to a reactor, wherein a second stream is added, which includes a polymetallic sulphides concentrate having a particle size lower than 20 µm, in order to achieve transformation of ferric ions into ferrous ions.

8. A bioleaching and solvent extraction process with selective recovery of copper and zinc from sulphide polymetallic concentrates, according to claim 7, wherein the ferric ion reduction step is carried out at a temperature of between about 60° C. and about 80° C., with acidity (pH) monitoring.

9. A bioleaching and solvent extraction process with selective recovery of copper and zinc from sulphide polymetallic concentrates, according to claim 8, wherein once the reaction is completed, the reactor output is sent to a filtration step in order to separate the non-reacted solids from the resulting solution rich in copper and zinc; the non-reacted solids are recycled to the pulp conditioning step, and the solution rich in copper and zinc, is sent to the copper solvent extraction and electrolysis step.

10. A bioleaching and solvent extraction process with selective recovery of copper and zinc from sulphide polymetallic concentrates, according to claim 1, wherein the copper solvent extraction and electrolysis step comprises countercurrently contacting the solution rich in copper and zinc coming from the ferric ion reduction step with an extractant organic compound, obtaining a copper loaded organic solution and an aqueous solution rich in zinc and arsenic; wherein phenolic oximes (aldoximes) dissolved in kerosene are preferably used as the organic extractant compound.

11. A bioleaching and solvent extraction process with selective recovery of copper and zinc from sulphide polymetallic concentrates, according to claim 10, wherein the organic solution stream loaded with copper is sent to an organic washing step wherein a copper loaded organic stream is obtained, which is then sent to a copper removing step; and, the aqueous solution stream rich in zinc and arsenic is sent to a water washing step in order to remove organic debris, prior to be sent to the arsenic control step.

12. A bioleaching and solvent extraction process with selective recovery of copper and zinc from sulphide polymetallic concentrates, according to claim 11, wherein the copper removal step comprises countercurrently contacting the copper loaded organic stream with a copper depleted electrolyte solution having an acidity of >150 g/l $H_2SO_4$, wherein the depleted electrolyte is enriched with copper from the organic stream, thus once the electrolyte is copper enriched, it is sent to a copper electrodeposition step, and the copper depleted organic stream is recycled to the solvent extraction step.

13. A bioleaching and solvent extraction process with selective recovery of copper and zinc from sulphide polymetallic concentrates, according to claim 12, wherein the copper depleted electrolyte being fed to the copper removal step, is a highly acidified electrolyte coming from the electrodeposition area, which is sent to said copper removal step, to start the loading cycle with copper again.

14. A bioleaching and solvent extraction process with selective recovery of copper and zinc from sulphide polymetallic concentrates, according to claim 11, wherein the aqueous solution stream rich in zinc and arsenic leaving the copper extraction step, once the aqueous has been washed to remove organic debris from the copper solvent extraction process, is sent to an arsenic control step.

15. A bioleaching and solvent extraction process with selective recovery of copper and zinc from sulphide polymetallic concentrates, according to claim 14, wherein the arsenic control step comprises feeding the aqueous solution rich in Zn and As to an arsenic conditioning and precipitation step, wherein the aqueous solution rich in zinc and arsenic is contacted with a pH modifying agent in order to generate ferric compounds ($FeAsO_4.2H_2O$) rich in As.

16. A bioleaching and solvent extraction process with selective recovery of copper and zinc from sulphide polymetallic concentrates, according to claim 15, wherein the pH modifying agent is selected from ammonium hydroxide, sodium hydroxide, calcium hydroxide, magnesium hydroxide, preferably using ammonium hydroxide.

17. A bioleaching and solvent extraction process with selective recovery of copper and zinc from sulphide polymetallic concentrates, according to claim 15, wherein the obtained solution is sent to a filtration step to separate a solution rich in zinc and arsenic-free from a high arsenic content paste; the solution rich in zinc and arsenic-free is sent to the zinc solvent extraction and electrolysis step; and, the high arsenic content paste is sent to final disposal.

18. A bioleaching and solvent extraction process with selective recovery of copper and zinc from sulphide polymetallic concentrates, according to claim 1, wherein the zinc solvent extraction and electrolysis step comprises sending the solution rich in zinc to a zinc extraction step, wherein the solution is countercurrently contacted with a zinc extractant dissolution, obtaining a zinc depleted aqueous solution which is rich in ferrous ions and a zinc loaded organic stream.

19. A bioleaching and solvent extraction process with selective recovery of copper and zinc from sulphide polymetallic concentrates, according to claim 18, wherein the zinc depleted solution is sent to a washing/conditioning step, prior to be sent back to the pulp conditioning step, and prior to be subjected again to the bioleaching step.

20. A bioleaching and solvent extraction process with selective recovery of copper and zinc from sulphide polymetallic concentrates, according to claim 18, wherein the zinc loaded organic stream is sent to an organic washing step wherein the aqueous solution debris is removed using an acidified $H_2SO_4$ aqueous solution having a pH between 2 and 3, prior to be subjected to a zinc selective removal step, followed by an iron selective removal step.

21. A bioleaching and solvent extraction process with selective recovery of copper and zinc from sulphide polymetallic concentrates, according to claim 20, wherein in the zinc removal step, a zinc depleted electrolyte solution coming from a zinc electrodeposition step is countercurrently enriched, when countercurrently contacted with the zinc loaded organic stream coming from the organic washing step; and the zinc enriched electrolyte solution obtained and leaving this removing step is sent to a zinc purification step and further it is sent to a zinc electrodeposition step in an electrodeposition cell.

22. A bioleaching and solvent extraction process with selective recovery of copper and zinc from sulphide polymetallic concentrates, according to claim 21, wherein the organic solution with the zinc already removed and now rich in iron, coming from the zinc removing step, is sent to an iron removing step, wherein iron Fe (III) co-extracted in the organic is extracted when countercurrently contacted with a sulphuric acid solution having an acidity of >200 g/L.

23. A bioleaching and solvent extraction process with selective recovery of copper and zinc from sulphide polymetallic concentrates, according to claim 22, wherein after separation in the iron Fe(III) removal step, the discharged organic flows to a neutralization step, prior to be countercurrently sent to the zinc solvent extraction step to start the loading cycle with zinc again.

24. A bioleaching and solvent extraction process with selective recovery of copper and zinc from sulphide polymetallic concentrates, according to claim 18, wherein phosphinic acids are used as the extractant dissolution, preferably 2,4,4 trimethylpentyl phosphinic acid.

25. A bioleaching and solvent extraction process with selective recovery of copper and zinc from sulphide polymetallic concentrates, according to claim 24, wherein the extractant dissolution is dissolved in kerosene with a concentration of about 10% to about 50% volume, which allows performing a zinc selective removal, and subsequently, of the co-extracted impurities, using only a single adjustment on the sulphuric acid concentration in the entire process.

* * * * *